United States Patent
Ota et al.

(10) Patent No.: US 12,339,486 B2
(45) Date of Patent: Jun. 24, 2025

(54) BACKLIGHT AND DISPLAY DEVICE

(71) Applicant: Japan Display Inc., Tokyo (JP)

(72) Inventors: Takashi Ota, Tokyo (JP); Nobuyuki Suzuki, Tokyo (JP); Shinichi Komura, Tokyo (JP); Hiroaki Kijima, Tokyo (JP); Koichi Okuda, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/679,541

(22) Filed: May 31, 2024

(65) Prior Publication Data

US 2024/0418925 A1   Dec. 19, 2024

(30) Foreign Application Priority Data

Jun. 13, 2023   (JP) .................................. 2023-096873

(51) Int. Cl.
 *F21V 8/00* (2006.01)
 *G02F 1/13357* (2006.01)

(52) U.S. Cl.
 CPC ........... *G02B 6/005* (2013.01); *G02B 6/0016* (2013.01); *G02B 6/0018* (2013.01); *G02B 6/0023* (2013.01); *G02B 6/0028* (2013.01); *G02B 6/0068* (2013.01); *G02B 6/0075* (2013.01); *G02B 6/0076* (2013.01); *G02F 1/133615* (2013.01)

(58) Field of Classification Search
 CPC .... G02B 6/0076; G02B 6/0028; G02B 6/002; G02B 6/0023; G02B 6/0016
 See application file for complete search history.

(56) References Cited

U.S. PATENT DOCUMENTS

| | | | |
|---|---|---|---|
| 2006/0007704 A1* | 1/2006 | Mori | G02B 6/0013 |
| | | | 362/613 |
| 2021/0333631 A1* | 10/2021 | Sun | G02B 6/0055 |
| 2023/0288624 A1* | 9/2023 | Nakamura | G02B 6/0023 |

FOREIGN PATENT DOCUMENTS

| | | | | |
|---|---|---|---|---|
| DE | 102017118012 A1 * | 7/2018 | | G02B 6/0011 |
| JP | 2020-126811 A | 8/2020 | | |
| WO | WO-2012066798 A1 * | 5/2012 | | G02B 6/0045 |

OTHER PUBLICATIONS

Machine translation of Liu et al., DE 102017118012 A1, published Jul. 5, 2018 (Year: 2018).*
Machine translation of Kurata et al., WO 2012/066798, published May 24, 2012 (Year: 2012).*

* cited by examiner

*Primary Examiner* — William N Harris
(74) *Attorney, Agent, or Firm* — Michael Best & Friedrich LLP (57) ABSTRACT

A backlight includes: a light guide plate including a front surface and a back surface, the light guide plate including an end face that connects one edge of the front surface and one edge of the back surface, at least part of the end face being inclined at an angle other than a right angle relative to the front surface; and a light source that emits light, the light source being set in an arrangement enabling emission of the light parallel to the front surface towards the at least part of the end face of the light guide plate, wherein the light is incident on and refracted at the at least part of the end face, propagates inside a material of the light guide plate, is reflected off the back surface, and is surface-emitted from the front surface.

17 Claims, 13 Drawing Sheets

BACKLIGHT AND DISPLAY DEVICE

CROSS-REFERENCE TO RELATED APPLICATION

The present application claims priority from Japanese patent application JP2023-096873 filed on Jun. 13, 2023, the contents of which are hereby incorporated by reference into this application.

BACKGROUND

1. Field

The present disclosure relates to a backlight and a display device.

2. Description of the Related Art

An edge-lit type backlight is designed to direct light to enter from an end face of a light guide plate. An incidence surface for the light can be wider if the end face of the light guide plate is angled (JP2020-126811A).

Directing the light onto the angled end face along its normal complicates the structure because a light source is angled relative to an emission surface of the light guide plate. Moreover, a lower end of the light source protrudes below a lower end of the end face, hindering thinning of the backlight.

SUMMARY

The present disclosure aims to achieve thinning of a backlight through a straightforward design.

A backlight includes: a light guide plate including a front surface and a back surface, the light guide plate including an end face that connects one edge of the front surface and one edge of the back surface, at least part of the end face being inclined at an angle other than a right angle relative to the front surface; and a light source that emits light, the light source being set in an arrangement enabling emission of the light parallel to the front surface towards the at least part of the end face of the light guide plate, wherein the light is incident on and refracted at the at least part of the end face, propagates inside a material of the light guide plate, is reflected off the back surface, and is surface-emitted from the front surface.

A display device includes: the backlight; and a display panel set in an arrangement enabling incidence of the light, emitted from the backlight, on a rear.

DETAILED DESCRIPTION

Hereinafter, some embodiments will be described with reference to the drawings. Here, the invention can be embodied according to various aspects without departing from the gist of the invention and is not construed as being limited to the content described in the embodiments exemplified below.

The drawings are further schematically illustrated in widths, thicknesses, shapes, and the like of units than actual forms to further clarify description in some cases but are merely examples and do not limit interpretation of the invention. In the present specification and the drawings, the same reference numerals are given to elements having the same functions described in the previously described drawings, and the repeated description will be omitted.

Further, in the detailed description, "on" or "under" in definition of positional relations of certain constituents, and other constituents includes not only a case in which a constituent is located just on or just under a certain constituent but also a case in which another constituent is interposed between constituents unless otherwise mentioned.

First Embodiment

Figure 1:
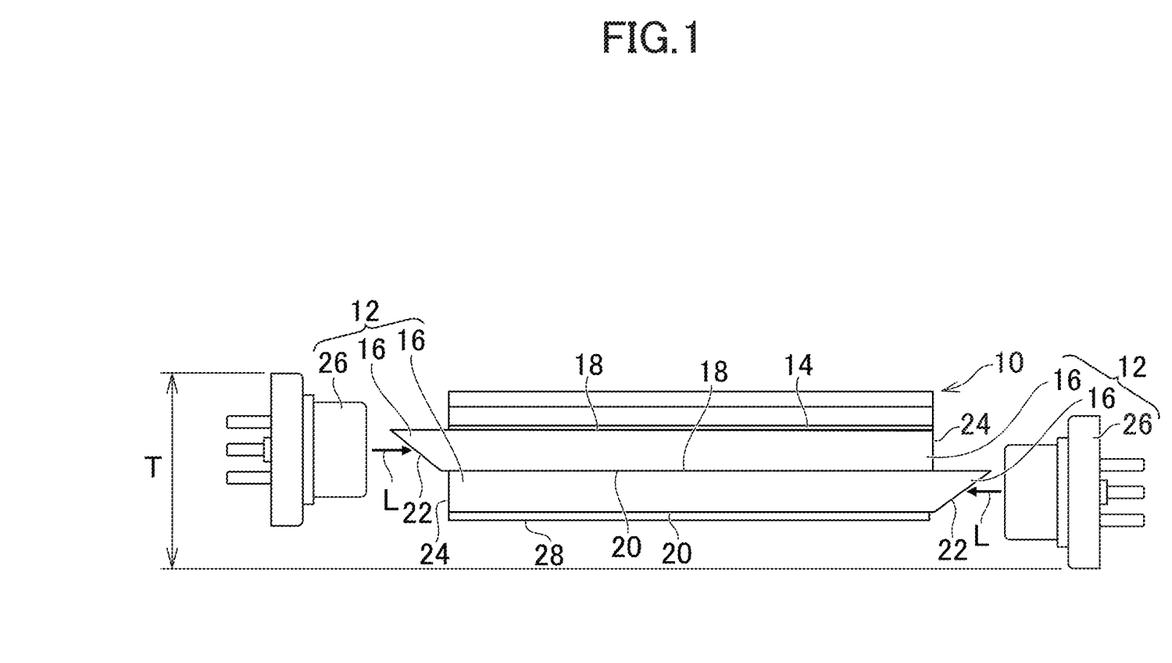
FIG. 1 is a cross-sectional view of a display device according to a first embodiment.

FIG. 1 is a cross-sectional view of a display device according to a first embodiment. The display device includes a display panel 10 (e.g., liquid crystal display panel). The display panel 10 is set in an arrangement enabling incidence of light, emitted from a backlight 12, on a rear. An optical sheet 14 is interposed between the rear of the display panel 10 and the backlight 12.

[Light Guide Plate]

The backlight 12 includes a light guide plate 16. The light guide plate 16 is included in light guide plates 16 overlapping with each other and is each of the light guide plates 16. Each light guide plate 16 includes a front surface 18 and a back surface 20. Each light guide plate 16 includes an end face 22 connecting one edge of the front surface 18 and one edge of the back surface 20. The light guide plate 16 includes a perpendicular end face 24 that is perpendicular to the front surface 18 and is opposite to the end face 22. One end face 22 of one of the light guide plates 16 and another end face 22 are opposite to each other. At least part of the end face 22 is oriented in a diagonally downward direction that combines a lateral direction outward from the one edge of the front surface 18 and a downward direction opposite to the front surface 18.

[Light Source]

As shown in FIG. 1, the backlight 12 includes a light source 26. The light source 26 is a laser diode (semiconductor laser) that emits light L. The light source 26 may be an unillustrated row of point light sources or a single linear light source. The light source 26 is included in light sources 26 and is each of the light sources 26. Each light source 26 is set in an arrangement enabling incidence of the light L on the at least part of the end face 22 of a corresponding one of the light guide plates 16. One light source 26 and another light source 26 are opposite to each other. This enables reduction of brightness unevenness attributable to a distance from the light source 26 because the light L is incident in opposite directions. The light source 26 is set in an arrangement enabling emission of the light L parallel to the front surface 18 towards at least part of the end face 22.

Figure 2:
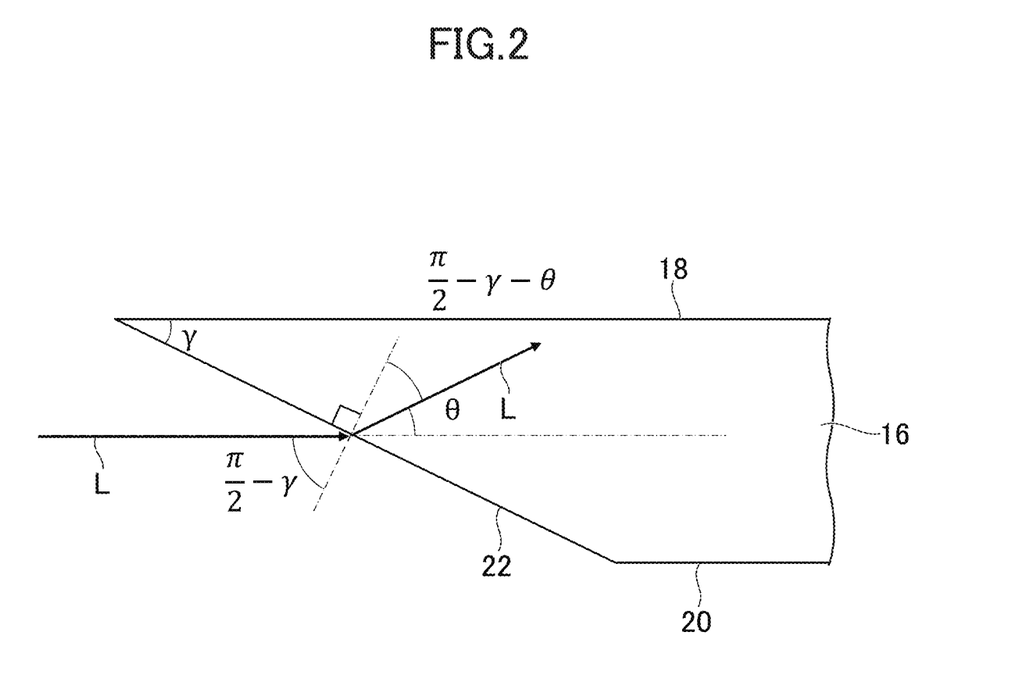
FIG. 2 is a detailed view of a light guide plate.

FIG. 2 is a detailed view of the light guide plate 16. The light L is incident on and refracted at the at least part of the end face 22. The light L propagates inside a material of the light guide plate 16. The light L is reflected off the back surface 20, and emitted in a planar manner from the front surface 18. Below the light guide plate 16 (opposite to the display panel 10), a reflective sheet 28 (FIG. 1) is placed. The light L passing through the back surface 20 is reflected off the reflective sheet 28 back into the material of the light guide plate 16.

As shown in FIG. 2, at least part (e.g., entirety) of the end face 22 is inclined at an angle γ (inside the material of the light guide plate 16) other than a right angle relative to the front surface 18. The incidence angle of the light L is π/2−γ. The light L propagates at an angle θ relative to the front surface 18 of the light guide plate 16. The angle θ is optimally 26.5 degrees. The refraction angle of the light L is π/2−γ−θ.

Figure 3:
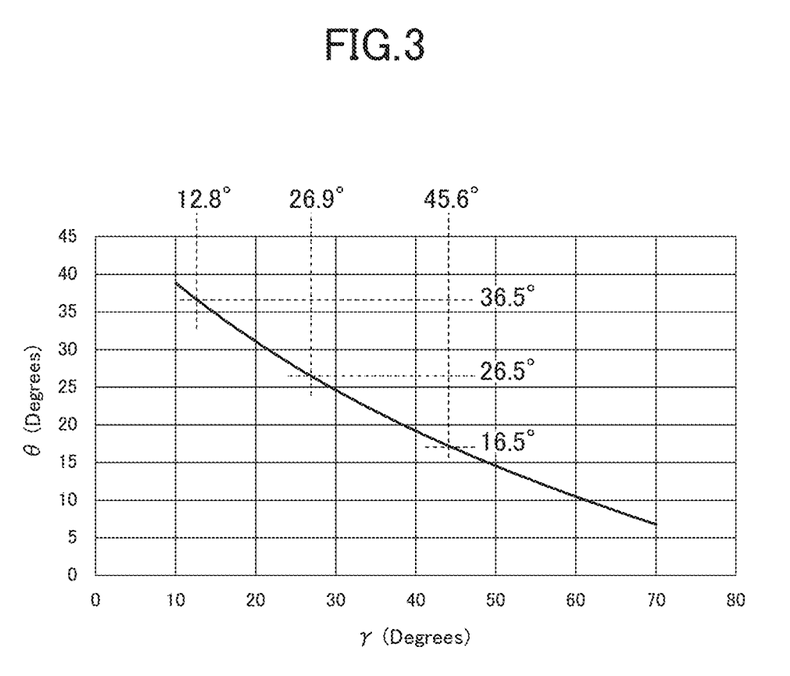
FIG. 3 is a diagram of relationship between an angle γ of an end face and an angle θ of propagation.

FIG. 3 is a diagram of relationship between an angle γ of the end face 22 and the angle θ of propagation. From Snell's law, the following equation holds:

$$n \sin\left(\frac{\pi}{2} - \gamma - \theta\right) = \sin\left(\frac{\pi}{2} - \gamma\right)$$

By transforming the above equation, the angle θ can be determined as follows:

$$\theta = \frac{\pi}{2} - \gamma - \sin^{-1}\left(\frac{1}{n} \sin\left(\frac{\pi}{2} - \gamma\right)\right)$$

With the refractive index n of the light guide plate 16 being 1.496, the angle γ of the end face 22, corresponding to the angle θ of 26.5 degrees optimal in terms of luminous efficiency, is optimally 26.9 degrees inside the material of the light guide plate 16. The preferable angle θ ranges from 36.5 degrees to 16.5 degrees, and the corresponding preferable angle γ of the end face 22 ranges from 12.8 degrees to 45.6 degrees inside the material of the light guide plate 16.

In this embodiment, the angled positioning of the end face 22 facilitates an increased incidence surface for the light L. The light source 26 is set in an arrangement enabling emission of the light L parallel to the front surface 18 of the light guide plate 16, so the lower end of the light source 26 does not protrude downwards. Therefore, as shown in FIG. 1, the thickness T remains modest, and thinning of the backlight 12 can be achieved through a straightforward design.

Variant 1 of First Embodiment

Figure 4:
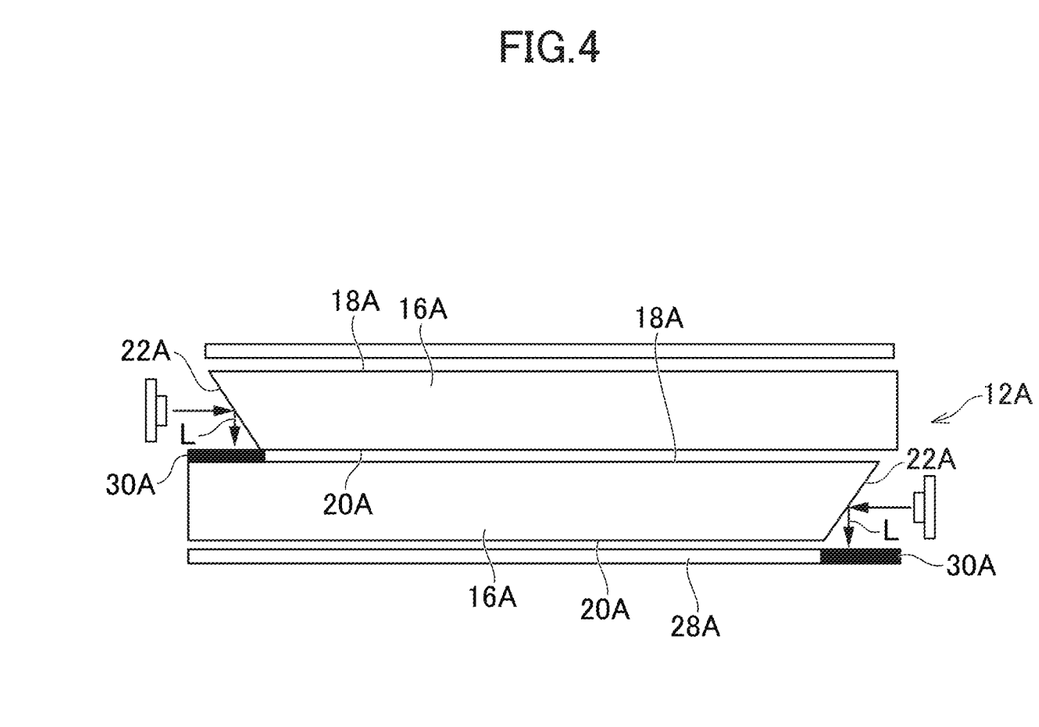
FIG. 4 is a cross-sectional view of a backlight according to variant 1 of the first embodiment.

FIG. 4 is a cross-sectional view of a backlight according to variant 1 of the first embodiment. The backlight 12A includes an anti-glare film 30A overlapping with the at least part of the end face 22A in the downward direction. The anti-glare film 30A may be a light-blocking film or a light-blocking tape. The anti-glare film 30A prevents the light L, reflected off the end face 22A, from returning to the light guide plate 16A.

The anti-glare film 30A does not overlap with the back surface 20A of the corresponding light guide plate 16A. The anti-glare film 30A may be attached to the front surface 18A of another light guide plate 16A located below the aforementioned light guide plate 16A. Under the lowest light guide plate 16A, the anti-glare film 30A and the reflective sheet 28A may be adjacent to (in contact with) each other, or the anti-glare film 30A may be on and overlap with the reflective sheet 28A.

Variant 2 of First Embodiment

Figure 5:
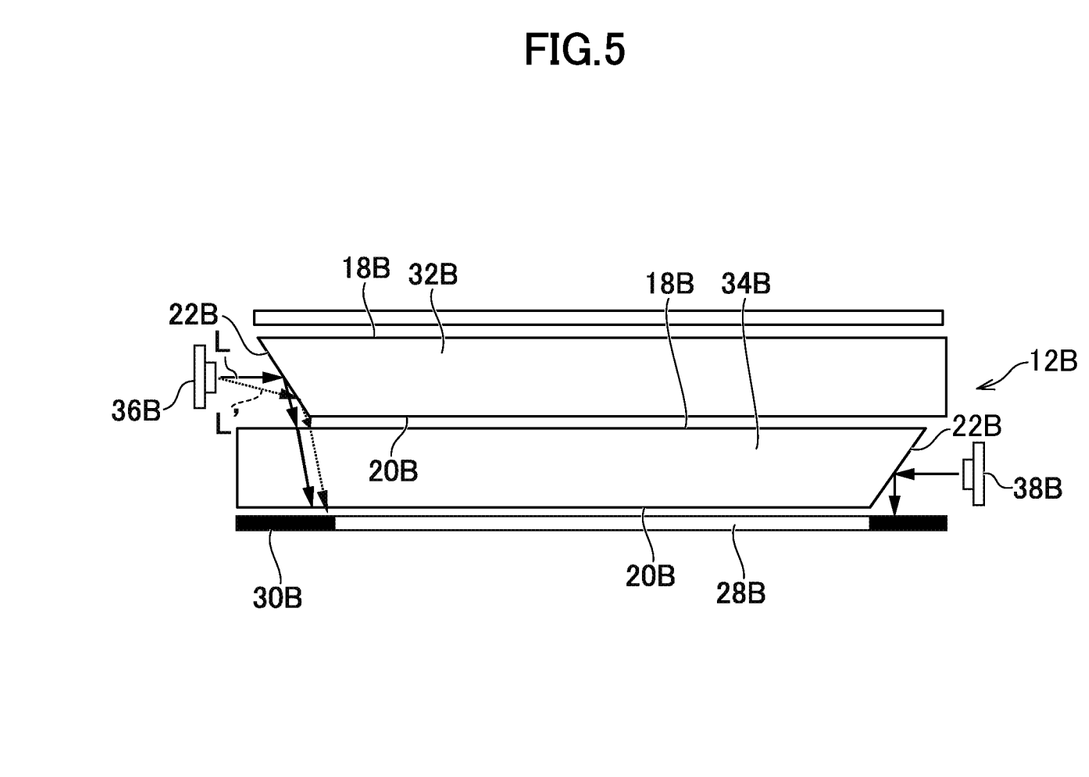
FIG. 5 is a cross-sectional view of a backlight according to variant 2 of the first embodiment.

FIG. 5 is a cross-sectional view of a backlight according to variant 2 of the first embodiment. The light guide plates are a first light guide plate 32B and a second light guide plate 34B. The second light guide plate 34B is located under the first light guide plate 32B. The end face 22B of the first light guide plate 32B and the end face 22B of the second light guide plate 34B are opposite to each other. The light sources are a first light source 36B and a second light source 38B. The first light source 36B and the second light source 38B are opposite to each other.

At least part of the end face 22B of the first light guide plate 32B is oriented in a diagonally downward direction that combines a lateral direction outward from one edge of the front surface 18B and a downward direction opposite to the front surface 18B. The backlight 12B includes an anti-glare film 30B that overlaps, in the downward direction, with the at least part of the end face 22B.

The light L from the first light source 36B, even though its optical axis is parallel to the front surface 18B of the first light guide plate 32B, spreads out to some extent radially. The light L' having a larger incidence angle on the end face 22B also have a larger reflection angle off the end face 22B, and moves from directly below the end face 22B to directly below the back surface 20B. Since there is a reflective sheet 28B directly below the back surface 20B, when the light L' is reflected off the reflective sheet 28B, it propagates in an undesirable direction (e.g., perpendicular to the display panel 10B). Therefore, the anti-glare film 30B extends, under the back surface 20B of the second light guide plate 34B, in a direction from directly below the end face 22B of the first light guide plate 32B to directly below the back surface 20B.

Second Embodiment

Figure 6:
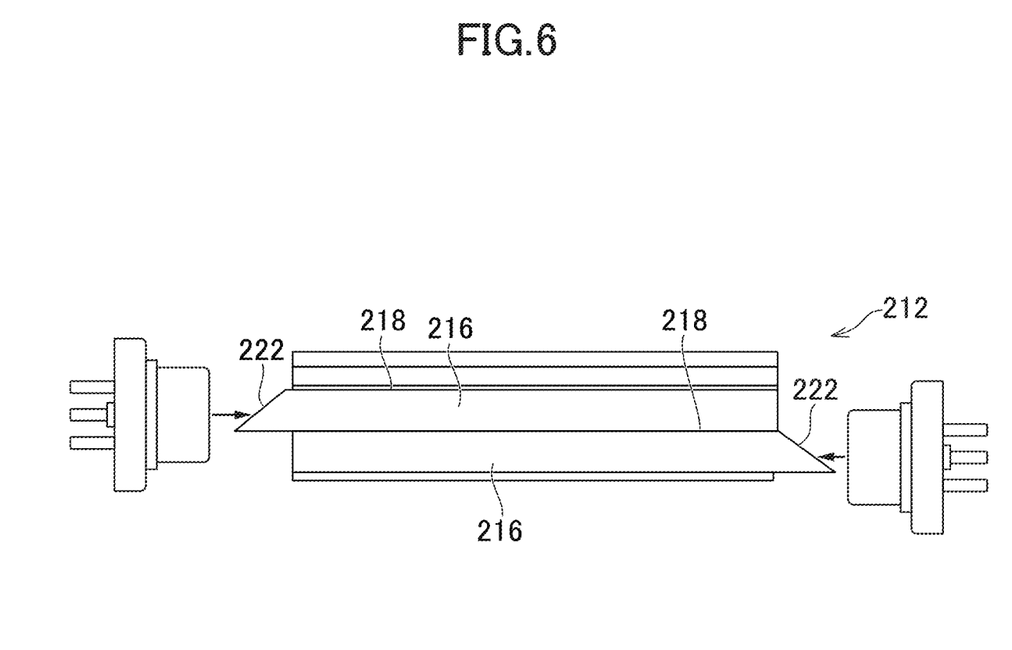
FIG. 6 is a cross-sectional view of a backlight according to a second embodiment.

FIG. 6 is a cross-sectional view of a backlight according to a second embodiment. At least part of the end face 222 is oriented in a diagonally upward direction that combines a lateral direction outward from one edge of the front surface 218 and an upward direction that the front surface 218 faces. At least part (e.g., entirety) of the end face 222 is inclined at an angle other than a right angle relative to the front surface 218.

Figure 7:
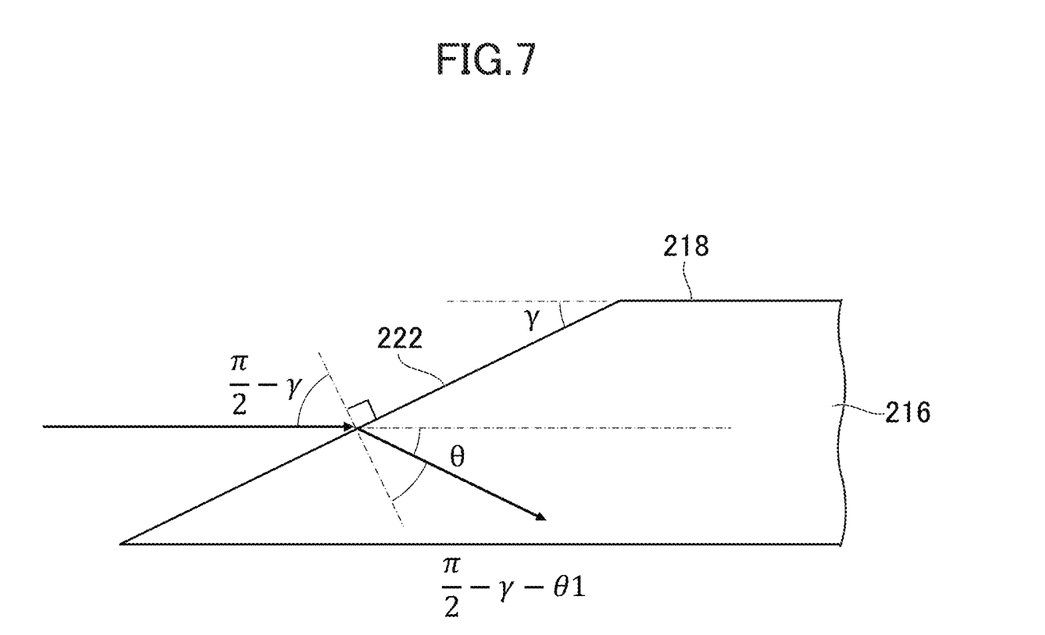
FIG. 7 is a detailed view of a light guide plate.

FIG. 7 is a detailed view of the light guide plate 216. Similar to the first embodiment, the angle θ can be determined using Snell's law. The optimal angle γ of the end face 222, corresponding to the angle θ of 26.5 degrees optimal in terms of luminous efficiency, is 26.9 degrees outside the material of the light guide plate 216. The preferable angle θ ranges from 36.5 degrees to 16.5 degrees, and the corresponding preferable angle γ of the end face 222 ranges from 12.8 degrees to 45.6 degrees outside the material of the light guide plate 216. The contents described in the first embodiment are applicable to this embodiment.

Variant 1 of Second Embodiment

Figure 8:
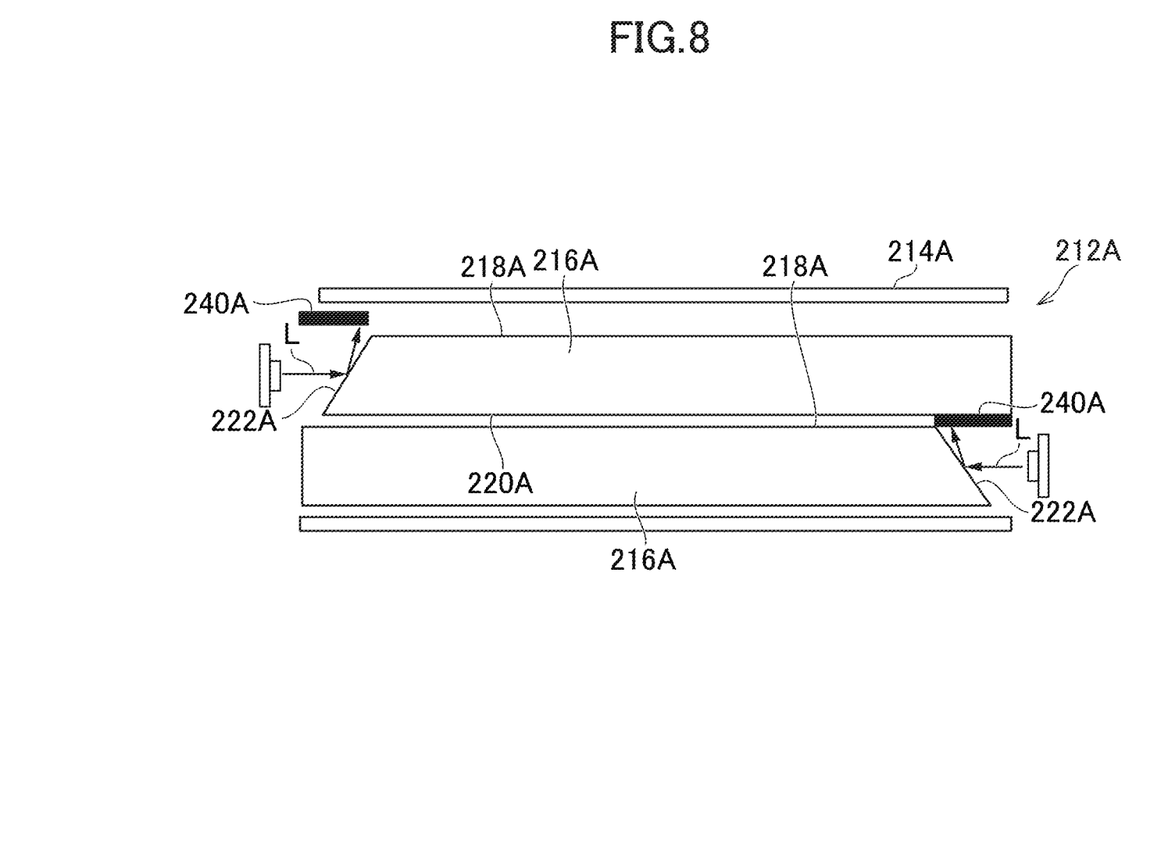
FIG. 8 is a cross-sectional view of a backlight according to variant 1 of the second embodiment.

FIG. 8 is a cross-sectional view of a backlight according to variant 1 of the second embodiment. The backlight 212A includes a light-blocking film 240A or a diffraction grating overlapping, in the upward direction, with at least part of the end face 222A. The light-blocking film 240A may be a light-blocking tape. The light-blocking film 240A blocks passage of the light L. The light-blocking film 240A or the diffraction grating is located under the optical sheet 214A. The light-blocking film 240A or the diffraction grating does not overlap with the front surface 218A of the corresponding light guide plate 216A. The light-blocking film 240A or a diffraction grating may be attached to the back surface 220A of another light guide plate 216A above the aforementioned light guide plate 216A.

Variant 2 of Second Embodiment

Figure 9:
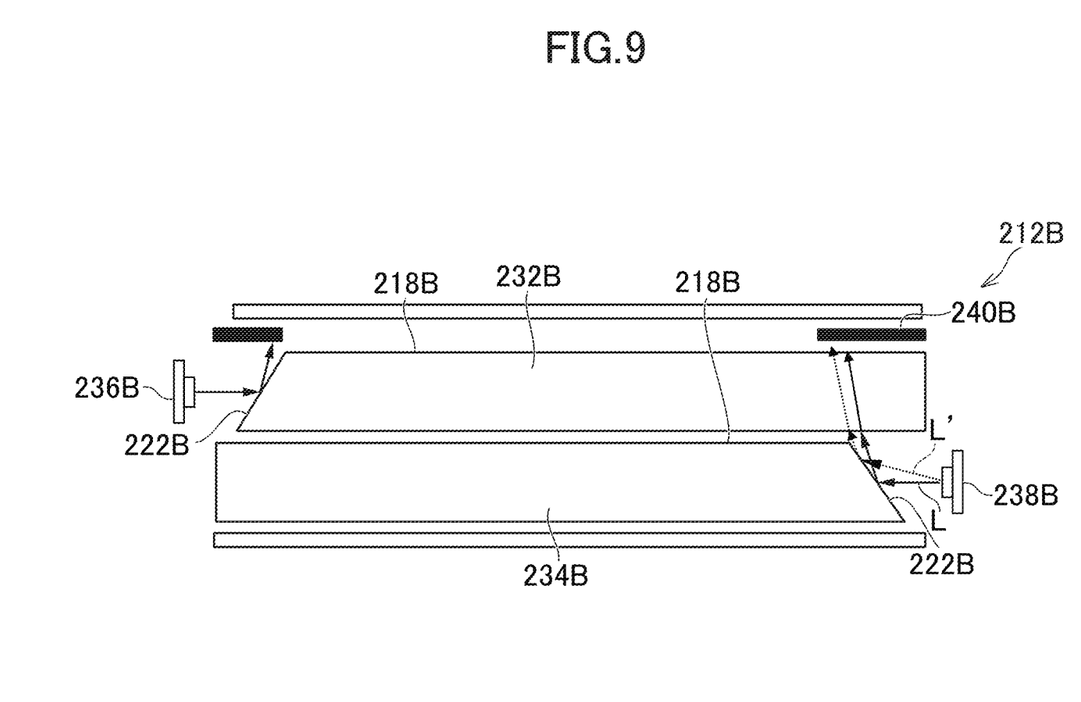
FIG. 9 is a cross-sectional view of a backlight according to variant 2 of the second embodiment.

FIG. 9 is a cross-sectional view of a backlight according to variant 2 of the second embodiment. The light guide plates are a first light guide plate 232B and a second light guide plate 234B. The first light guide plate 232B is located above the second light guide plate 234B. The end face 222B of the first light guide plate 232B and the end face 222B of the second light guide plate 234B are opposite to each other. The light sources are a first light source 236B and a second light source 238B. The first light source 236B and the second light source 238B are opposite to each other.

At least part of the end face 222B of the second light guide plate 234B is oriented in a diagonally upward direction that combines a lateral direction outward from one edge of the front surface 218B and an upward direction that the front surface 218B faces. The backlight 212B includes a light-blocking film 240B or a diffraction grating overlapping, in the upward direction, with at least part of the end face 222B of the second light guide plate 234B.

The light L from the second light source 238B, even though its optical axis is parallel to the front surface 218B of the second light guide plate 234B, spreads out to some extent radially. The light L' having a larger incidence angle on the end face 222B also have a larger reflection angle off the end face 222B. The light L' reflected off the end face 222B propagates in an undesirable direction (e.g., perpendicular to the display panel). Therefore, the light-blocking film 240B or the diffraction grating extends, above the front surface 218B of the first light guide plate 232B, in a direction from directly above the end face 222B of the second light guide plate 234B to directly above the front surface 218B.

Third Embodiment

Figure 10:
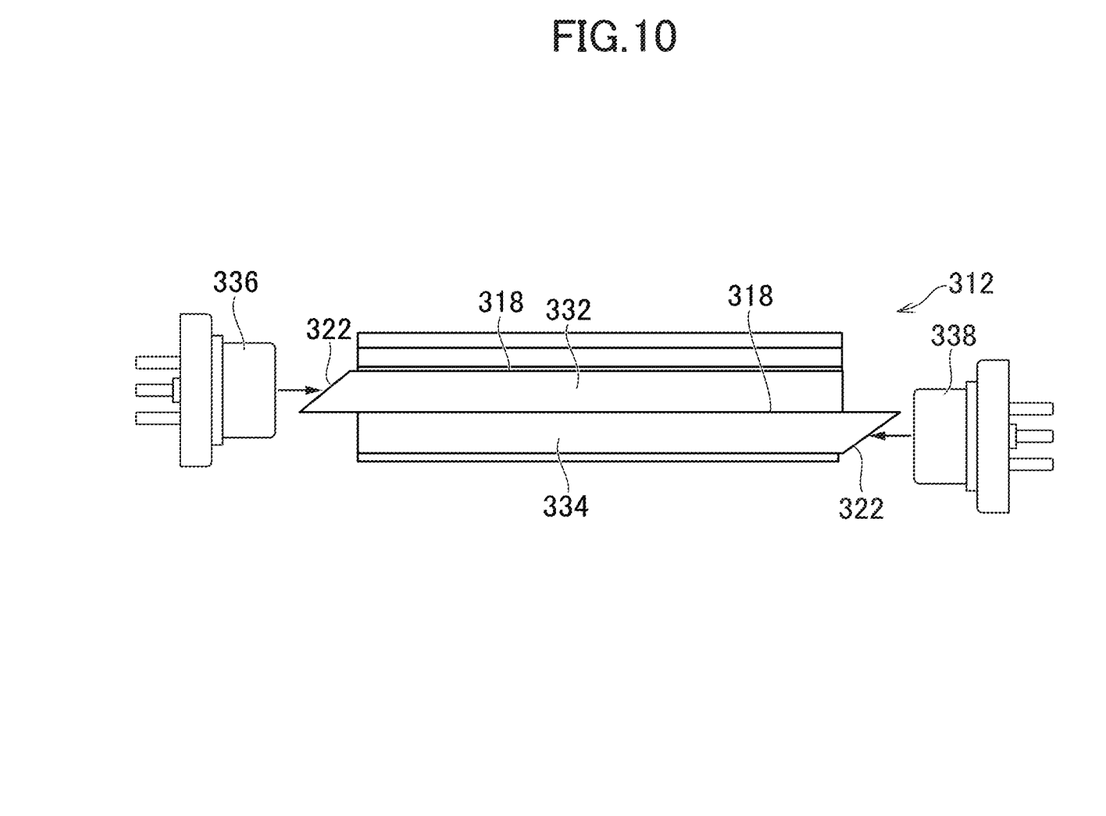
FIG. 10 is a cross-sectional view of a backlight according to a third embodiment.

FIG. 10 is a cross-sectional view of a backlight according to a third embodiment. The light guide plates are a first light guide plate 332 and a second light guide plate 334. The second light guide plate 334 is located under the first light guide plate 332. The end face 322 of the first light guide plate 332 and the end face 322 of the second light guide plate 334 are opposite to each other. The light sources are a first light source 336 and a second light source 338. The first light source 336 and the second light source 338 are opposite to each other.

At least part of the end face 322 of the first light guide plate 332 is oriented in a diagonally upward direction that combines a lateral direction outward from one edge of the front surface 318 and an upward direction that the front surface 318 faces. At least part of the end face 322 of the second light guide plate 334 is oriented in a diagonally downward direction that combines a lateral direction outward from one edge of the front surface 318 and a downward direction opposite to the front surface 318. The contents described in the first embodiment and the second embodiment are applicable to this embodiment.

Variant of Third Embodiment

Figure 11:
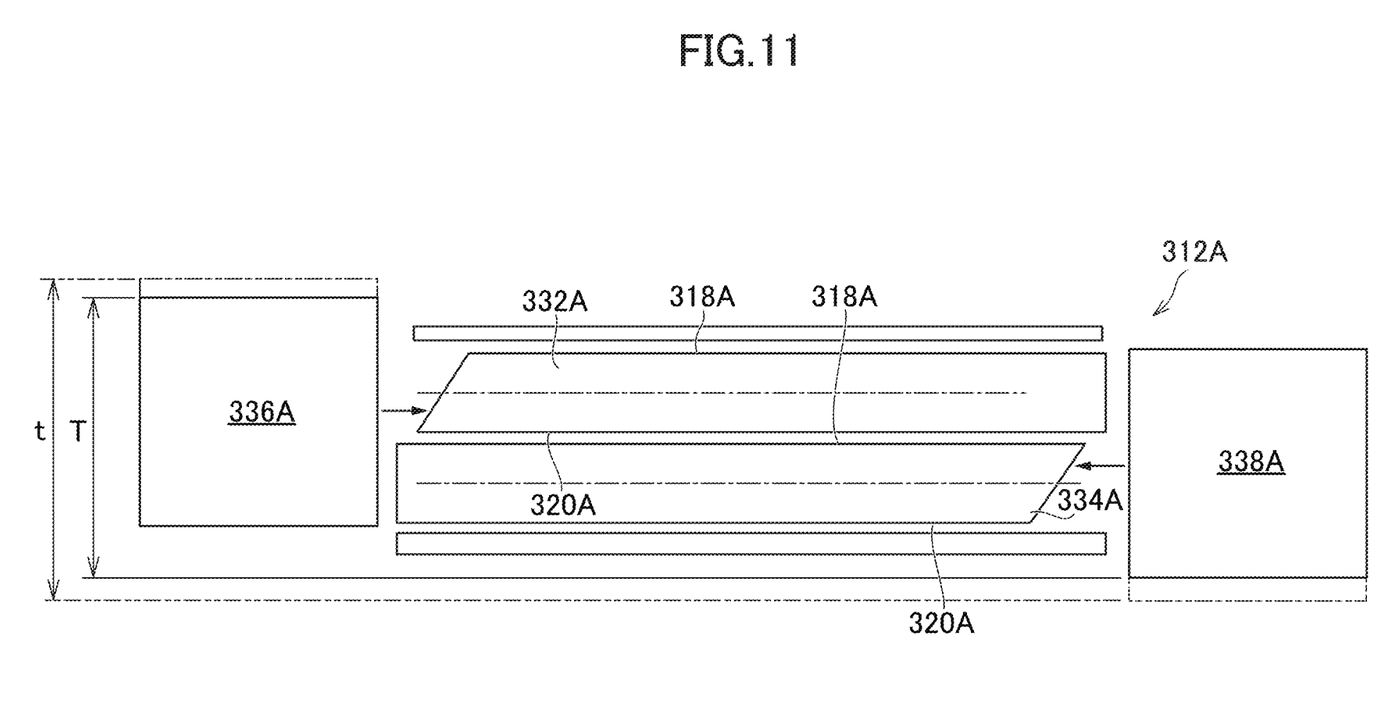
FIG. 11 is a cross-sectional view of a backlight according to a variant of the third embodiment.

FIG. 11 is a cross-sectional view of a backlight according to a variant of the third embodiment. The back surface 320A of the first light guide plate 332A and the front surface 318A of the second light guide plate 334A face each other. The first light source 336A is set in an arrangement enabling incidence of the light L on a position closer to the back surface 320A than to a midpoint between the front surface 318A and the back surface 320A. The second light source 338A is set in an arrangement enabling incidence of the light L on a position closer to the front surface 318A than to the midpoint between the front surface 318A and the back surface 320A.

According to this embodiment, the thickness T of the backlight 312A can be made thinner than the thickness t of a backlight that enables incidence of light on the midpoint between the front surface 318A and the back surface 320A.

Fourth Embodiment

Figure 12:
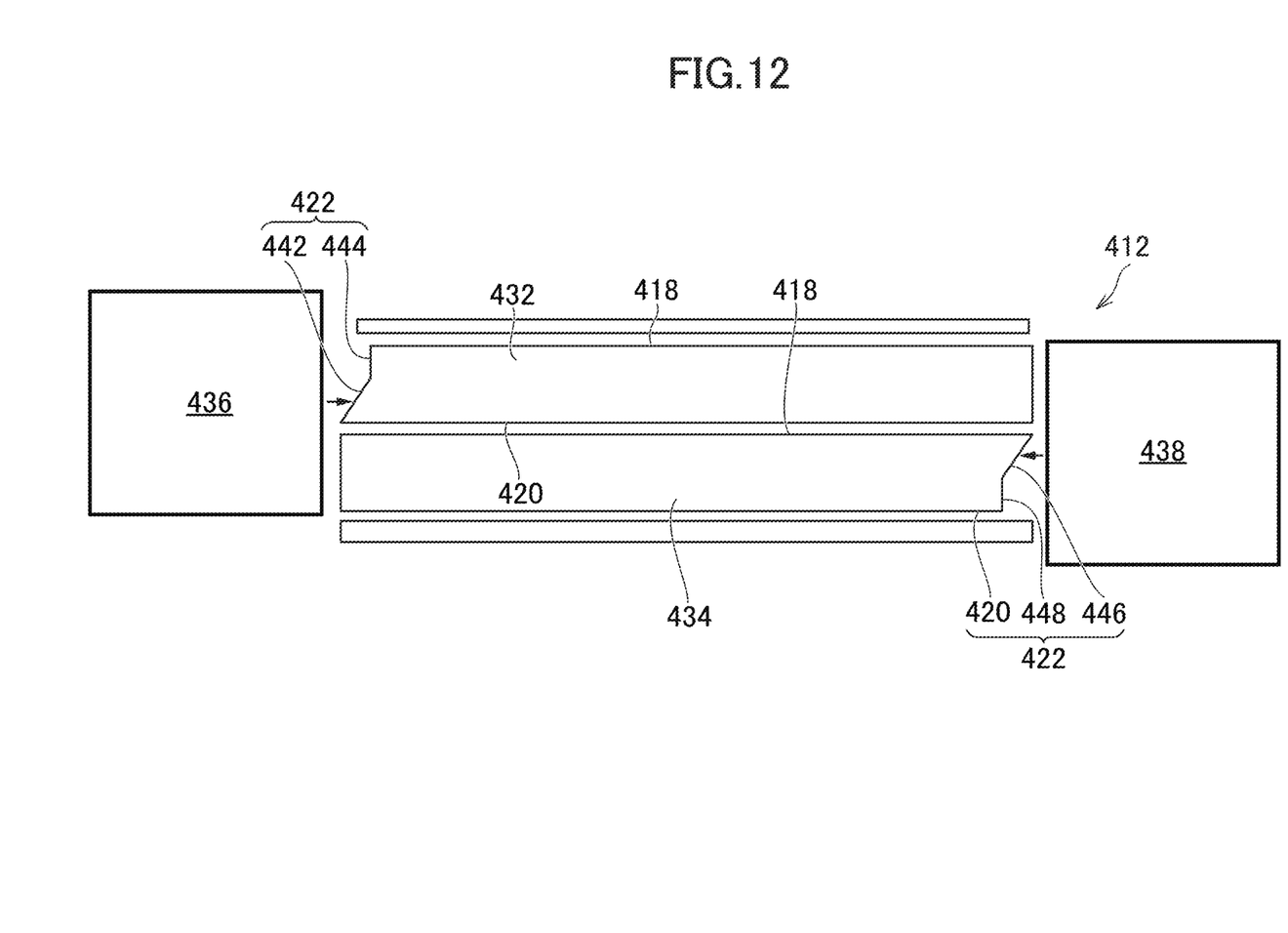
FIG. 12 is a cross-sectional view of a backlight according to a fourth embodiment.

FIG. 12 is a cross-sectional view of a backlight according to a fourth embodiment. The light guide plates are a first light guide plate 432 and a second light guide plate 434. The back surface 420 of the first light guide plate 432 and the front surface 418 of the second light guide plate 434 face each other. The end face 422 of the first light guide plate 432 and the end face 422 of the second light guide plate 434 are opposite to each other. The light sources are a first light source 436 and a second light source 438. The first light source 436 and the second light source 438 are opposite to each other.

At least part of the end face 422 of the first light guide plate 432 is a first inclined surface 442 connected to the back surface 420. The end face 422 of the first light guide plate 432 further includes a first upright surface 444 standing and connected to the front surface 418. The first upright surface 444 enables expansion of the front surface 418, ensuring a wide support area.

At least part of the end face 422 of the second light guide plate 434 is a second inclined surface 446 connected to the front surface 418. The end face 422 of the second light guide plate 434 further includes a second upright surface 448 standing and connected to the back surface 420. The second upright surface 448 enables expansion of the back surface 420, ensuring a wide support area. The contents described in the third embodiment are applicable to this embodiment.

Fifth Embodiment

Figure 13:
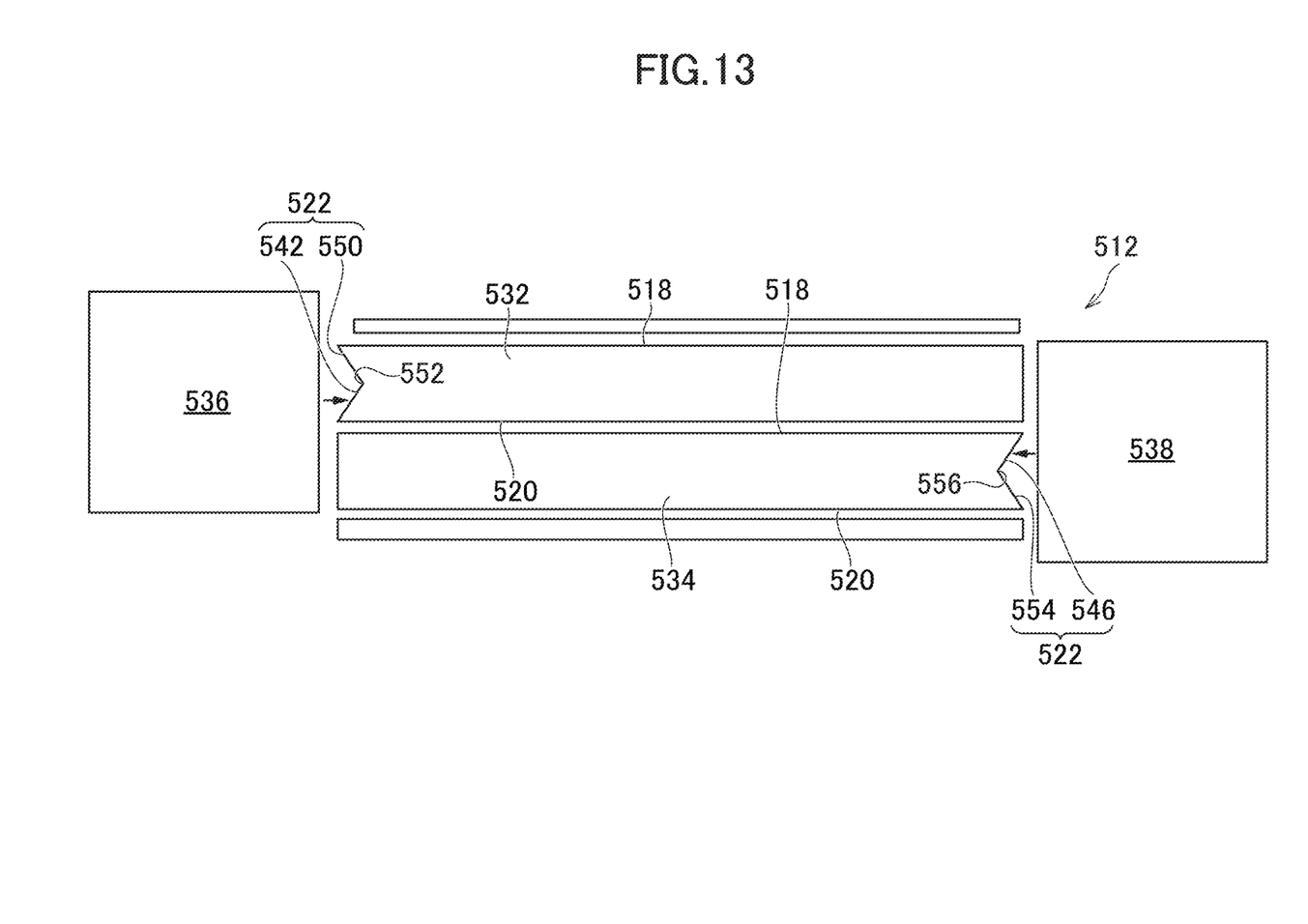
FIG. 13 is a cross-sectional view of a backlight according to a fifth embodiment.

FIG. 13 is a cross-sectional view of a backlight according to a fifth embodiment. The light guide plates are a first light guide plate 532 and a second light guide plate 534. The back surface 520 of the first light guide plate 532 and the front surface 518 of the second light guide plate 534 face each other. The end face 522 of the first light guide plate 532 and the end face 522 of the second light guide plate 534 are opposite to each other. The light sources are a first light source 536 and a second light source 538. The first light source 536 and the second light source 538 are opposite to each other.

At least part of the end face 522 of the first light guide plate 532 is a first inclined surface 542 connected to the back surface 520. The end face 522 of the first light guide plate 532 further includes a first reverse-inclined surface 550. The first inclined surface 542 and the first reverse-inclined surface 550 constitute a first recess 552. The first reverse-inclined surface 550 enables expansion of the front surface 518, ensuring a wide support area.

At least part of the end face 522 of the second light guide plate 534 is a second inclined surface 546 connected to the front surface 518. The end face 522 of the second light guide plate 534 further includes a second reverse-inclined surface 554. The second inclined surface 546 and the second reverse-inclined surface 554 constitute a second recess 556. The second reverse-inclined surface 554 enables expansion of the back surface 520, ensuring a wide support area. The contents described in the third embodiment are applicable to this embodiment.

Outline of Embodiments (1) A backlight 12 including: a light guide plate 16 including a front surface 18 and a back surface 20, the light guide plate 16 including an end face 22 that connects one edge of the front surface 18 and one edge of the back surface 20, at least part of the end face 22 being inclined at an angle other than a right angle relative to the front surface 18; and a light source 26 that emits light, the light source 26 being set in an arrangement enabling emission of the light parallel to the front surface 18 towards the at least part of the end face 22 of the light guide plate 16, wherein the light is incident on and refracted at the at least part of the end face 22, propagates inside a material of the light guide plate 16, is reflected off the back surface 20, and is emitted in a planar manner from the front surface 18.

The angled positioning of the end face 22 facilitates an increased incidence surface for the light L. The light source 26 is set in an arrangement enabling emission of the light L parallel to the front surface 18 of the light guide plate 16, so the lower end of the light source 26 does not protrude downwards, whereby thinning of the backlight 12 can be achieved through a straightforward design.

(2) The backlight 12 according to (1), wherein the light guide plate 16 further includes a perpendicular end face 24 that is opposite to the end face 22 and perpendicular to the front surface 18.

(3) The backlight 12 according to (1) or (2), wherein the light guide plate 16 is included in light guide plates 16 overlapping with each other and is each of the light guide plates 16, the light source 26 is included in light sources 26 and is each of the light sources 26, and each of the light sources 26 is set in an arrangement enabling incidence of the light on the at least part of the end face 22 of a corresponding one of the light guide plates 16.

(4) The backlight 12B according to (3), wherein the light guide plates 16B are a first light guide plate 32B and a second light guide plate 34B, the end face 22B of the first light guide plate 32B and the end face 22B of the second light guide plate 34B are opposite to each other, the light sources 26B are a first light source 36B and a second light source 38B, and the first light source 36B and the second light source 38B are opposite to each other.

(5) The backlight 12 according to any one of (1) to (3), wherein the at least part of the end face 22 is oriented in a diagonally downward direction that combines a lateral direction outward from the one edge of the front surface 18 and a downward direction opposite to the front surface 18.

(6) The backlight 12 according to (5), wherein the angle, inside the material of the light guide plate 16, is between 12.8 degrees and 45.6 degrees, inclusive.

(7) The backlight 12A according to (5) or (6), further including an anti-glare film 30A that overlaps, in the downward direction, with the at least part of the end face 22A.

(8) The backlight 212 according to any one of (1) to (3), wherein the at least part of the end face 222 is oriented in a diagonally upward direction that combines a lateral direction outward from the one edge of the front surface 218 and an upward direction the front surface 218 faces.

(9) The backlight 212 according to (8), wherein the angle, outside the material of the light guide plate 216, is between 12.8 degrees and 45.6 degrees, inclusive.

(10) The backlight 212A according to (8) or (9), further including a light-blocking film 240A or a diffraction grating that overlaps, in the upward direction, with the at least part of the end face 222A.

(11) The backlight 12B according to (4), wherein the at least part of the end face 22B of the first light guide plate 32B is oriented in a diagonally downward direction that combines a lateral direction outward from the one edge of the front surface 18B and a downward direction opposite to the front surface 18B.

(12) The backlight 12B according to (11), further including an anti-glare film 30B that overlaps, in the downward direction, with the at least part of the end face 22B of the first light guide plate 32B, wherein the second light guide plate 34B is located under the first light guide plate 32B, and the anti-glare film 30B extends, under the back surface 20B of the second light guide plate 34B, in a direction from directly below the end face 22B of the first light guide plate 32B to directly below the back surface 20B.

(13) The backlight 212B according to (4), wherein the at least part of the end face 222B of the second light guide plate 234B is oriented in a diagonally upward direction that combines a lateral direction outward from the one edge of the front surface 218B and an upward direction the front surface 218B faces.

(14) The backlight 212B according to (13), further including a light-blocking film 240B or a diffraction grating that overlaps, in the upward direction, with the at least part of the end face 222B of the second light guide plate 234B, wherein the first light guide plate 232B is located over the second light guide plate 234B, and the light-blocking film 240B or the diffraction grating extends, over the front surface 218B of the first light guide plate 232B, in a direction from directly above the end face 222B of the second light guide plate 234B to directly above the front surface 218B.

(15) The backlight 312 according to (4), wherein the at least part of the end face 322 of the first light guide plate 332 is oriented in a diagonally upward direction that combines a lateral direction outward from the one edge of the front surface 318 and an upward direction the front surface 318 faces, and the at least part of the end face 322 of the second light guide plate 334 is oriented in a diagonally downward direction that combines a lateral direction outward from the one edge of the front surface 318 and a downward direction opposite to the front surface 318.

(16) The backlight 312A according to (15), wherein the back surface 320A of the first light guide plate 332A and the front surface 318A of the second light guide plate 334A face each other, the first light source 336A is set in an arrangement enabling incidence of the light on a position closer to the back surface 320A than to a midpoint between the front surface 318A and the back surface 320A, and the second light source 338A is set in an arrangement enabling incidence of the light on a position closer to the front surface 318A than to the midpoint between the front surface 318A and the back surface 320A.

(17) The backlight 412 according to (16), wherein the at least part of the end face 422 of the first light guide plate 432 is a first inclined surface 442 connected to the back surface 420, the end face 422 of the first light guide plate further includes a first upright surface 444 standing and connected to the front surface 418, the at least part of the end face 422 of the second light guide plate 434 is a second inclined surface 446 connected to the front surface 418, and the end face 422 of the second light guide plate further includes a second upright surface 448 standing and connected to the back surface 420.

(18) The backlight 512 according to (16), wherein the at least part of the end face 522 of the first light guide plate 532 is a first inclined surface 542 connected to the back surface 520, the end face 522 of the first light guide plate 532 further includes a first reverse-inclined surface 550 connected to the front surface 518, the first inclined surface 542 and the first reverse-inclined surface 550 constitute a first recess 552, the at least part of the end face 522 of the second light guide plate 534 is a second inclined surface 546 connected to the front surface 518, the end face 522 of the second light guide plate 534 further includes a second reverse-inclined surface 554 connected to the back surface 520, and the second inclined surface 546 and the second reverse-inclined surface 554 constitute a second recess 556.

(19) A display device including: the backlight 12 according to any one of (1) to (18); and a display panel 10 set in an arrangement enabling incidence of the light, emitted from the backlight 12, on a rear.

The embodiments described above are not limited and different variations are possible. The structures explained in the embodiments may be replaced with substantially the same structures and other structures that can achieve the same effect or the same objective.

What is claimed is:

1. A backlight comprising:
a light guide plate including a front surface and a back surface, the light guide plate including an end face that connects one edge of the front surface and one edge of the back surface, at least part of the end face being inclined at an angle other than a right angle relative to the front surface; and
a light source that emits light, the light source being set in an arrangement enabling emission of the light parallel to the front surface towards the at least part of the end face of the light guide plate, wherein the light is incident on and refracted at the at least part of the end face, propagates inside a material of the light guide plate, is reflected off the back surface, and is emitted in a planar manner from the front surface,
wherein
the light guide plate is included in light guide plates overlapping with each other and is each of the light guide plates,
the light source is included in light sources and is each of the light sources, each of the light sources is set in an arrangement enabling incidence of the light on the at least part of the end face of a corresponding one of the light guide plates,
the light guide plates are a first light guide plate and a second light guide plate,
the end face of the first light guide plate and the end face of the second light guide plate are opposite to each other,
the light sources are a first light source and a second light source, and
the first light source and the second light source are opposite to each other.

2. The backlight according to claim 1, wherein the light guide plate further includes a perpendicular end face that is opposite to the end face and perpendicular to the front surface.

3. The backlight according to claim 1, wherein the at least part of the end face is oriented in a diagonally downward direction that combines a lateral direction outward from the one edge of the front surface and a downward direction opposite to the front surface.

4. The backlight according to claim 3, wherein the angle, inside the material of the light guide plate, is between 12.8 degrees and 45.6 degrees, inclusive.

5. The backlight according to claim 3, further comprising an anti-glare film that overlaps, in the downward direction, with the at least part of the end face.

6. The backlight according to claim 1, wherein the at least part of the end face is oriented in a diagonally upward direction that combines a lateral direction outward from the one edge of the front surface and an upward direction the front surface faces.

7. The backlight according to claim 6, wherein the angle, outside the material of the light guide plate, is between 12.8 degrees and 45.6 degrees, inclusive.

8. The backlight according to claim 6, further comprising a light-blocking film or a diffraction grating that overlaps, in the upward direction, with the at least part of the end face.

9. The backlight according to claim 1, wherein the at least part of the end face of the first light guide plate is oriented in a diagonally downward direction that combines a lateral direction outward from the one edge of the front surface and a downward direction opposite to the front surface.

10. The backlight according to claim 9, further comprising an anti-glare film that overlaps, in the downward direction, with the at least part of the end face of the first light guide plate,
wherein the second light guide plate is located under the first light guide plate, and
the anti-glare film extends, under the back surface of the second light guide plate, in a direction from directly below the end face of the first light guide plate to directly below the back surface.

11. The backlight according to claim 1, wherein the at least part of the end face of the second light guide plate is oriented in a diagonally upward direction that combines a lateral direction outward from the one edge of the front surface and an upward direction the front surface faces.

12. The backlight according to claim 11, further comprising a light-blocking film or a diffraction grating that overlaps, in the upward direction, with the at least part of the end face of the second light guide plate,
wherein the first light guide plate is located over the second light guide plate, and
the light-blocking film or the diffraction grating extends, over the front surface of the first light guide plate, in a direction from directly above the end face of the second light guide plate to directly above the front surface.

13. The backlight according to claim 1, wherein
the at least part of the end face of the first light guide plate is oriented in a diagonally upward direction that combines a lateral direction outward from the one edge of the front surface and an upward direction the front surface faces, and
the at least part of the end face of the second light guide plate is oriented in a diagonally downward direction that combines a lateral direction outward from the one edge of the front surface and a downward direction opposite to the front surface.

14. The backlight according to claim 13, wherein
the back surface of the first light guide plate and the front surface of the second light guide plate face each other,
the first light source is set in an arrangement enabling incidence of the light on a position closer to the back surface than to a midpoint between the front surface and the back surface, and
the second light source is set in an arrangement enabling incidence of the light on a position closer to the front surface than to the midpoint between the front surface and the back surface.

15. The backlight according to claim 14, wherein
the at least part of the end face of the first light guide plate is a first inclined surface connected to the back surface,
the end face of the first light guide plate further includes a first upright surface standing and connected to the front surface,
the at least part of the end face of the second light guide plate is a second inclined surface connected to the front surface, and
the end face of the second light guide plate further includes a second upright surface standing and connected to the back surface.

16. The backlight according to claim 14, wherein
the at least part of the end face of the first light guide plate is a first inclined surface connected to the back surface,
the end face of the first light guide plate further includes a first reverse-inclined surface connected to the front surface,
the first inclined surface and the first reverse-inclined surface constitute a first recess,
the at least part of the end face of the second light guide plate is a second inclined surface connected to the front surface,
the end face of the second light guide plate further includes a second reverse-inclined surface connected to the back surface, and
the second inclined surface and the second reverse-inclined surface constitute a second recess.

17. A display device comprising:
the backlight according to claim 1; and
a display panel set in an arrangement enabling incidence of the light, emitted from the backlight, on a back of the display panel.

* * * * *